US008736634B2

(12) United States Patent
Yokomizo

(10) Patent No.: US 8,736,634 B2
(45) Date of Patent: May 27, 2014

(54) COLOR SCHEME CHANGING APPARATUS, COLOR SCHEME CHANGING METHOD, AND COLOR SCHEME CHANGING PROGRAM

(71) Applicant: Azusa Yokomizo, Tokyo (JP)

(72) Inventor: Azusa Yokomizo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/006,554

(22) PCT Filed: Nov. 22, 2012

(86) PCT No.: PCT/JP2012/007526
§ 371 (c)(1),
(2), (4) Date: Sep. 20, 2013

(87) PCT Pub. No.: WO2013/128523
PCT Pub. Date: Sep. 6, 2013

(65) Prior Publication Data
US 2014/0071154 A1    Mar. 13, 2014

(30) Foreign Application Priority Data

Feb. 29, 2012    (JP) .................................. 2012-043639

(51) Int. Cl.
*G09G 5/02*    (2006.01)
*G06K 9/00*    (2006.01)

(52) U.S. Cl.
USPC ........... 345/595; 382/167; 345/589; 345/591; 345/593

(58) Field of Classification Search
CPC ............. G06K 9/00234; G06K 9/4652; G06T 2207/10024
See application file for complete search history.

(56) References Cited

U.S. PATENT DOCUMENTS

| 8,248,431 B2 * | 8/2012 | Shirata ........................ 345/589 |
| 2005/0089220 A1 * | 4/2005 | Park et al. ..................... 382/167 |
| 2007/0201749 A1 * | 8/2007 | Yamauchi et al. ............ 382/225 |

(Continued)

FOREIGN PATENT DOCUMENTS

| JP | 09-081761 A | 3/1997 |
| JP | 2006-107905 A | 4/2006 |
| JP | 2009-260530 A | 11/2009 |
| WO | 2006/082979 A1 | 8/2006 |

OTHER PUBLICATIONS

Wang, Lujin, et al. "Color design for illustrative visualization." Visualization and Computer Graphics, IEEE Transactions on 14.6 (2008): 1739-1754.*

(Continued)

*Primary Examiner* — Kee M Tung
*Assistant Examiner* — Zhengxi Liu
(74) *Attorney, Agent, or Firm* — Sughrue Mion, PLLC

(57) ABSTRACT

There is provided a color scheme changing apparatus capable of changing a color scheme on a screen immediately depending on the situation so that each piece of information that makes up the screen will always stand out within the entire screen according to the degree of importance thereof. A color scheme changing apparatus 1 includes: an input unit which accepts the designation of an evaluation target screen from a user; a color scheme information acquiring unit 11 which acquires object identification information and color scheme information; an attractiveness calculation unit 12 which performs attractiveness calculation processing, an importance storage unit 13 which stores importance information; a color scheme appropriateness determining unit 14 which determines whether the order of the importance information associated with the objects matches the order of degrees of attractiveness associated with the objects; an improvement plan creating unit 15 in which, if not match, color scheme information in which at least one of used colors is changed is output to the attractiveness calculation unit 12, or if match, improved color scheme information including the previously determined objects is output; a screen drawing unit 16; and an output unit 19.

9 Claims, 9 Drawing Sheets

(56) References Cited

U.S. PATENT DOCUMENTS

2008/0079962 A1* 4/2008 Torikoshi .................. 358/1.9

OTHER PUBLICATIONS

Strothotte, Thomas. "Measuring and Highlighting in Graphics." Computational Visualization. Springer Berlin Heidelberg, 1999. 121-136.*

Yuji Kikuta, et al., "Information Visualization and its Evaluation using Importance and User Visibility", Technical Report of IEICE, May 2000, pp. 41-48, DE 2006-6.

Shoji Tanaka, et al., "An Attractiveness Evaluation Model Based on the Physical Features of Image Regions", Journal of IEICE, May 2000, pp. 576-588, vol. J83-A, No. 5.

* cited by examiner

FIG. 5

| OBJECT NAME<br>51 | COLOR (RGB)<br>52 | AREA (px)<br>53 | ATTRIBUTE<br>54 | SCREEN<br>55 |
|---|---|---|---|---|
| OBJECT 0 | #FFFFFF | 4900 | BACKGROUND | TRAIN DIAGRAM 40 |
| OBJECT 1 | #FF0000 | 400 | OTHER | TRAIN DIAGRAM 40 |
| OBJECT 2 | #0000FF | 1200 | OTHER | TRAIN DIAGRAM 40 |
| OBJECT 3 | #FF6600 | 3500 | OTHER | TRAIN DIAGRAM 40 |

FIG. 6

| OBJECT NAME | COLOR (RGB) | AREA (px) | ATTRIBUTE | CHARACTERISTIC ATTRACTIVENESS 61 | HETEROGENEOUS ATTRACTIVENESS 62 | DEGREE OF ATTRACTIVENESS 63 | SCREEN |
|---|---|---|---|---|---|---|---|
| OBJECT 0 | #FFFFFF | 4900 | BACKGROUND | — | — | — | TRAIN DIAGRAM 40 |
| OBJECT 1 | #FF0000 | 400 | OTHER | 3.0 | 1.7 | 4.7 | TRAIN DIAGRAM 40 |
| OBJECT 2 | #0000FF | 1200 | OTHER | 2.8 | 2.2 | 5.0 | TRAIN DIAGRAM 40 |
| OBJECT 3 | #FF6600 | 3500 | OTHER | 2.3 | 0.6 | 2.9 | TRAIN DIAGRAM 40 |

FIG. 7

| OBJECT NAME | COLOR (RGB) | AREA (px) | ATTRIBUTE | ORDER OF ATTRACTIVENESS | SCREEN |
|---|---|---|---|---|---|
| OBJECT 0 | #FFFFFF | 4900 | BACKGROUND | — | TRAIN DIAGRAM 40 |
| OBJECT 1 | #FF0000 | 400 | OTHER | 2 | TRAIN DIAGRAM 40 |
| OBJECT 2 | #0000FF | 1200 | OTHER | 1 | TRAIN DIAGRAM 40 |
| OBJECT 3 | #FF6600 | 3500 | OTHER | 3 | TRAIN DIAGRAM 40 |

FIG. 8

| OBJECT NAME | ATTRIBUTE | IMPORTANCE | MEANING OF INFORMATION | SCREEN |
|---|---|---|---|---|
| OBJECT 0 | BACKGROUND | — | — | TRAIN DIAGRAM 40 |
| OBJECT 1 | OTHER | 100 | APPROACH ALERT | TRAIN DIAGRAM 40 |
| OBJECT 2 | OTHER | 80 | TRAIN | TRAIN DIAGRAM 40 |
| OBJECT 3 | OTHER | 20 | STATION AND RAILWAY TRACK | TRAIN DIAGRAM 40 |
| OBJECT 4 | OTHER | 20 | RAILROAD CROSSING | TRAIN DIAGRAM 40 |

FIG. 9

| OBJECT NAME | ATTRIBUTE | ORDER OF IMPORTANCE | SCREEN |
|---|---|---|---|
| OBJECT 0 | BACKGROUND | — | TRAIN DIAGRAM 40 |
| OBJECT 1 | OTHER | 1 | TRAIN DIAGRAM 40 |
| OBJECT 2 | OTHER | 2 | TRAIN DIAGRAM 40 |
| OBJECT 3 | OTHER | 3 | TRAIN DIAGRAM 40 |

FIG. 10

| OBJECT NAME | COLOR (RGB) | AREA (px) | ATTRIBUTE | VALUE OF ATTRACTIVENESS | ORDER OF ATTRACTIVENESS | VALUE OF IMPORTANCE | ORDER OF IMPORTANCE | DETERMINATION RESULT | SCREEN |
|---|---|---|---|---|---|---|---|---|---|
| OBJECT 0 | #FFFFFF | 4900 | BACKGROUND | — | — | — | — | — | TRAIN DIAGRAM 40 |
| OBJECT 1 | #FF0000 | 400 | OTHER | 4.7 | 2 | 100 | 1 | DISAPPROVAL | TRAIN DIAGRAM 40 |
| OBJECT 2 | #0000FF | 1200 | OTHER | 5.0 | 1 | 80 | 2 | DISAPPROVAL | TRAIN DIAGRAM 40 |
| OBJECT 3 | #FF6600 | 3500 | OTHER | 2.9 | 3 | 20 | 3 | APPROVAL | TRAIN DIAGRAM 40 |

FIG. 11

| OBJECT NAME | COLOR IN IMPROVEMENT PLAN (RGB) | AREA (px) | ATTRIBUTE | SCREEN |
|---|---|---|---|---|
| OBJECT 0 | #FFFFFF | 4900 | BACKGROUND | TRAIN DIAGRAM 40 |
| OBJECT 1 | #FF1919 | 400 | OTHER | TRAIN DIAGRAM 40 |
| OBJECT 2 | #0707F9 | 1200 | OTHER | TRAIN DIAGRAM 40 |
| OBJECT 3 | #FF6600 | 3500 | OTHER | TRAIN DIAGRAM 40 |

FIG. 12

| OBJECT NAME | COLOR (RGB) | AREA (px) | ATTRIBUTE | VALUE OF ATTRACTIVENESS | ORDER OF ATTRACTIVENESS | VALUE OF IMPORTANCE | ORDER OF IMPORTANCE | DETERMINATION RESULT | SCREEN |
|---|---|---|---|---|---|---|---|---|---|
| OBJECT 0 | #FFFFFF | 4900 | BACKGROUND | — | — | — | — | — | TRAIN DIAGRAM 40 |
| OBJECT 1 | #FF1919 | 400 | OTHER | 4.8 | 2 | 100 | 1 | DISAPPROVAL | TRAIN DIAGRAM 40 |
| OBJECT 2 | #0707F9 | 1200 | OTHER | 4.9 | 1 | 80 | 2 | DISAPPROVAL | TRAIN DIAGRAM 40 |
| OBJECT 3 | #FF6600 | 3500 | OTHER | 2.7 | 3 | 20 | 3 | APPROVAL | TRAIN DIAGRAM 40 |

FIG. 13

| OBJECT NAME | COLOR (RGB) | AREA (px) | ATTRIBUTE | VALUE OF ATTRACTIVENESS | ORDER OF ATTRACTIVENESS | VALUE OF IMPORTANCE | ORDER OF IMPORTANCE | DETERMINATION RESULT | SCREEN |
|---|---|---|---|---|---|---|---|---|---|
| OBJECT 0 | #FFFFFF | 4900 | BACKGROUND | — | — | — | — | — | TRAIN DIAGRAM 40 |
| OBJECT 1 | #FF3333 | 400 | OTHER | 5.2 | 1 | 100 | 1 | APPROVAL | TRAIN DIAGRAM 40 |
| OBJECT 2 | #1F1FAD | 1200 | OTHER | 4.7 | 2 | 80 | 2 | APPROVAL | TRAIN DIAGRAM 40 |
| OBJECT 3 | #FF6600 | 3500 | OTHER | 2.7 | 3 | 20 | 3 | APPROVAL | TRAIN DIAGRAM 40 |

FIG. 14

| OBJECT NAME | COLOR IN IMPROVEMENT PLAN (RGB) | SCREEN |
|---|---|---|
| OBJECT 0 | #FFFFFF | TRAIN DIAGRAM 40 |
| OBJECT 1 | #FF3333 | TRAIN DIAGRAM 40 |
| OBJECT 2 | #1F1FAD | TRAIN DIAGRAM 40 |
| OBJECT 3 | #FF6600 | TRAIN DIAGRAM 40 |

US 8,736,634 B2

COLOR SCHEME CHANGING APPARATUS, COLOR SCHEME CHANGING METHOD, AND COLOR SCHEME CHANGING PROGRAM

CROSS REFERENCE TO RELATED APPLICATIONS

This is a National Stage of International Application No. PCT/JP2012/007526, filed Nov. 22, 2012, claiming priority from Japanese Patent Application No. 2012-043639, filed Feb. 29, 2012, the contents of all of which are incorporated herein by reference in their entirety.

TECHNICAL FIELD

The present invention relates to a color scheme changing apparatus for changing the color scheme of a screen to make the balance of the entire screen appropriate, and particularly to a color scheme changing apparatus in consideration of human visual characteristics.

BACKGROUND ART

If a display is so provided that information highly important to a user is made conspicuous among various pieces of information on a screen, the screen can be a user-friendly screen. Elements that affect the conspicuousness of information include color as well as size and layout. In general, a designer determines the color scheme of a screen to coordinate colors in such a manner that each piece of information that makes up a screen will be conspicuous at an appropriate level within the entire screen depending on the degree of importance of each piece of information.

However, the kinds of information and the number of pieces of information to be displayed on the screen vary from situation to situation. For example, in the case of a screen in a monitoring service system, the number of pieces of alert or warning information to be displayed on the screen increases in the event of an abnormal situation compared with the normal situation. In this case, the proportion of the area of a color assigned to the alert or warning information on the screen increases. Thus, if the kinds of information or the number of pieces of information to be displayed on the screen vary, the balance of conspicuousness of respective colors on the entire screen may break down. For example, suppose that the system designer assigns, to alert information, red color that stands out alone on the screen in the monitoring system mentioned above on the assumption that the alert information is highly importance to users. However, for example, if many pieces of alert information are displayed on the screen in the event of an abnormal situation, the proportion of red on the screen will become high, reducing the conspicuousness of red in terms of the entire screen.

The color scheme determined when the screen is designed cannot be changed in most cases after the product is completed. Although there is a case where a user may be allowed to customize the screen even after the product is completed, the user is required to carry out change operations point by point. Further, when a user with no knowledge of the color scheme and the screen design customizes the screen, the screen may not have an appropriate color scheme according to the degree of importance on the screen. Therefore, it is desired that the color scheme can be changed immediately in response to a change in situation on the screen so that information that makes up the screen always stands out according to the degree of importance to the user.

Described in Non Patent Literature (NPL) 1 is a technique for evaluating a method of setting a color and area of each piece of information when plural pieces of information different in priority are displayed on a screen. This technique can evaluate, as a so-called "visualization achievement" value, display appropriateness as the entire screen in consideration of the attention-getting degree and priority of each piece of information on the screen.

A technique described in Non Patent Literature (NPL) 2 is able to calculate the conspicuousness of each color used within a screen in an attractiveness evaluation model in which a characteristic attractiveness as the conspicuousness of a color alone and a heterogeneous attractiveness as the conspicuousness of a color compared with the other colors are considered together. This technique can calculate the conspicuousness of respective colors in consideration of the balance of the entire screen.

Described in Patent Literature (PTL) 1 is a technique for controlling the way of making a region conspicuous by giving a difference in color or hatching density according to the area or importance of the region in a document. The saturation or shading of a color as an element used to determine the conspicuousness of the color alone can be changed according to the area or importance of the region, enabling easy coloring.

CITATION LIST

Patent Literature

PTL 1: Japanese Patent Application Publication No. 09-081761

Non Patent Literatures

NPL 1: "Information Visualization and its Evaluation using Importance and User Visibility," Yuji Kikuta, Sozo Inoue, and Mizuho Iwaihara, Technical Report of IEICE, DE2000-6 (2000-05), pp 41-48.

NPL 2: "An Attractiveness Evaluation Model Based on the Physical Features of Image Regions," Shoji Tanaka, Seiji Inokuchi, Yuichi Iwadate, and Ryohei Nakatsu, Journal of IEICE, May, 2000, Vol. J83-A, No. 5, pp 576-588.

SUMMARY OF INVENTION

Technical Problem

In the technique described in NPL 1, the appropriateness of a display on the entire screen is evaluated as a "visualization achievement" value. However, the appropriateness of a display of each individual information on the screen is not evaluated. Therefore, when the visualization achievement value is not sufficient, there is a problem that it is not known for which piece of information the color should be changed to improve the evaluation value.

The technique described in NPL 2 can evaluate how each color used in the screen stands out within the entire screen. However, since the meaning and degree of importance of information to which each color is applied in the screen are not considered, there is a problem that it cannot be determined whether the way of making each color conspicuous is appropriate according to the meaning and degree of importance of the information in an image.

In the technique described in PTL 1, a color is applied according to the degree of importance of a region in a document in consideration of the conspicuousness of the color alone. Therefore, the conspicuousness of each individual region alone is coordinated. However, since no balance is considered in terms of the entire document, there is a problem that target conspicuousness of each region may not be able to be achieved. Further, since the result of applying the color is not evaluated, there is another problem that it is not guaranteed that the color scheme is really appropriate.

It is an object of the present invention to provide a color scheme changing apparatus capable of changing a color scheme on a screen immediately depending on the situation so that information that makes up the screen always stands out within the entire screen according to the degree of importance of each piece of information.

Solution to Problem

A color scheme changing apparatus according to the present invention includes: an input unit which accepts the designation of an evaluation target screen from a user; a color scheme information acquiring unit which acquires identification information on objects displayed on the evaluation target screen and color scheme information including all colors used for the objects; an attractiveness calculation unit which uses the color scheme information to perform attractiveness calculation processing for calculating degrees of attractiveness indicative of degrees of the used colors to get visual attention, respectively; an importance storage unit which stores importance information indicative of levels of importance of the respective object relative to one another; a color scheme appropriateness determining unit which calculates the order of the importance information associated with the objects based on the levels of the importance information, calculates the order of the degrees of attractiveness associated with the objects based on levels of the degrees of attractiveness, determines whether the order of the importance information associated with the objects matches the order of the degrees of attractiveness associated with the objects, and outputs determination results; an improvement plan creating unit which outputs, to the attractiveness calculation unit, the color scheme information in which at least one of the used colors used for the objects is changed when the order of the importance information associated with the objects does not match the order of the degrees of attractiveness associated with the objects in the determination results, or outputs improved color scheme information including the previously determined objects when the order of the importance information associated with the objects matches the order of the degrees of attractiveness associated with the objects in the determination results; a screen drawing unit which refers to the improved color scheme information to draw an evaluation target screen improved according to the improved color scheme information; and an output unit which displays the evaluation target screen drawn by the screen drawing unit.

A color scheme determination method according to the present invention includes: accepting the designation of an evaluation target screen from a user; acquiring identification information on objects displayed on the evaluation target screen and color scheme information including all colors used for the objects; using the color scheme information to perform attractiveness calculation processing for calculating degrees of attractiveness indicative of degrees of the used colors to get visual attention, respectively; storing importance information indicative of levels of importance of the respective object relative to one another; calculating the order of the importance information associated with the objects based on the levels of the importance information, calculating the order of the degrees of attractiveness associated with the objects based on levels of the degrees of attractiveness, determining whether the order of the importance information associated with the objects matches the order of the degrees of attractiveness associated with the objects, and outputting determination results; performing the attractiveness calculation processing using the color scheme information in which at least one of the used colors used for the objects is changed when the order of the importance information associated with the objects does not match the order of the degrees of attractiveness associated with the objects in the determination results, or outputting improved color scheme information including the previously determined objects when the order of the importance information associated with the objects matches the order of the degrees of attractiveness associated with the objects in the determination results; referring to the improved color scheme information to draw an evaluation target screen improved according to the improved color scheme information; and displaying the evaluation target screen drawn by a screen drawing unit.

A color scheme determination program according to the present invention causes a computer to execute: an input process for accepting the designation of an evaluation target screen from a user; a color scheme information acquiring process for acquiring identification information on objects displayed on the evaluation target screen and color scheme information including all colors used for the objects; an attractiveness calculation process for using the color scheme information to perform attractiveness calculation processing for calculating degrees of attractiveness indicative of degrees of the used colors to get visual attention, respectively; an importance storage process for storing importance information indicative of levels of importance of the respective object relative to one another; a color scheme appropriateness determining process for calculating the order of the importance information associated with the objects based on the levels of the importance information, calculating the order of the degrees of attractiveness associated with the objects based on levels of the degrees of attractiveness, determining whether the order of the importance information associated with the objects matches the order of the degrees of attractiveness associated with the objects, and outputting determination results; an improvement plan creating process for causing the attractiveness calculation processing to be performed using the color scheme information in which at least one of the used colors used for the objects is changed when the order of the importance information associated with the objects does not match the order of the degrees of attractiveness associated with the objects in the determination results, or outputting improved color scheme information including the previously determined objects when the order of the importance information associated with the objects matches the order of the degrees of attractiveness associated with the objects in the determination results; a screen drawing process for referring to the improved color scheme information to draw an evaluation target screen improved according to the improved color scheme information; and an output process for displaying the evaluation target screen drawn by a screen drawing unit.

Advantageous Effects of Invention

According to the present invention, the color scheme can be changed immediately depending on the situation so that each piece of information that makes up the screen will always stand out within the entire screen according to the degree of importance thereof.

BRIEF DESCRIPTION OF DRAWINGS

FIG. 5 It depicts an explanatory diagram representing an example of a data structure including colors and areas output from a color scheme information acquiring unit.

FIG. 6 It depicts an explanatory diagram representing an example of a data structure including the degree of attractiveness of each color output from an attractiveness calculation unit.

FIG. 7 It depicts an explanatory diagram representing an example of a data structure including the order of degree of attractiveness of each color created by a color scheme appropriateness determining unit.

FIG. 8 It depicts an explanatory diagram representing an example of a data structure including importance information indicative of the level of importance of each color and stored in an importance storage unit.

FIG. 9 It depicts an explanatory diagram representing an example of a data structure including the order of importance of each color created by the color scheme appropriateness determining unit.

FIG. 10 It depicts an explanatory diagram representing an example of a data structure including first determination results output from the color scheme appropriateness determining unit.

FIG. 11 It depicts an explanatory diagram representing an example of a data structure including colors in a first improvement plan created by an improvement plan creating unit.

FIG. 12 It depicts an explanatory diagram representing an example of a data structure including second determination results output from the color scheme appropriateness determining unit.

FIG. 13 It depicts an explanatory diagram representing an example of a data structure including final determination results output from the color scheme appropriateness determining unit.

FIG. 14 It depicts an explanatory diagram representing an example of a data structure including a final improvement plan created by the improvement plan creating unit.

DESCRIPTION OF EMBODIMENT

Figure 1:
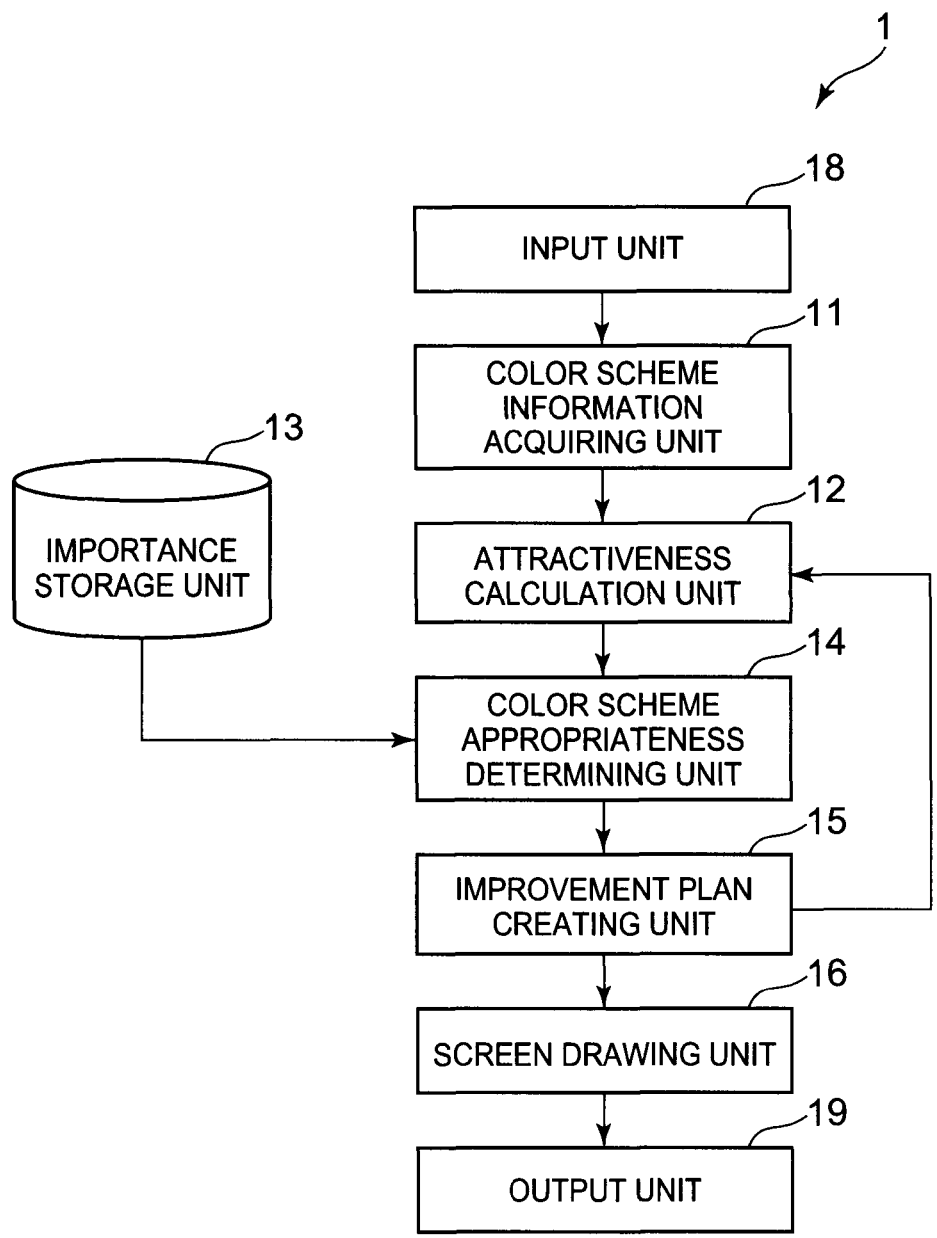
FIG. 1 It depicts a block diagram showing the structure of an exemplary embodiment of a color scheme changing apparatus according to the present invention.

An exemplary embodiment of a color scheme changing apparatus according to the present invention will next be described in detail with reference to the accompanying drawings. FIG. 1 is a block diagram showing the structure of a color scheme changing apparatus 1 of the exemplary embodiment.

As shown in FIG. 1, the color scheme changing apparatus 1 of the exemplary embodiment includes a color scheme information acquiring unit 11, an attractiveness calculation unit 12, an importance storage unit 13, a color scheme appropriateness determining unit 14, an improvement plan creating unit 15, a screen drawing unit 16, an input unit 18, and an output unit 19.

The color scheme information acquiring unit 11 acquires, as color scheme information, information for identifying an object, such as an icon, text, a line, or a component on an evaluation target screen, designated by a user of the color scheme changing apparatus 1 (hereinafter simply called the user) through the input unit 18, a color used for each object, and the area of each object. For example, the method of identifying objects is to set "object 1," "object 2," "object 3," etc. The notation of colors may be any notation as long as each color is uniquely determined. For example, RGB values in hexadecimal notation such as "#FF0000" may be used. The method of expressing the area may be, for example, pixel notation such as "500 px." The color scheme information acquiring unit 11 identifies, as the background color, a color of the largest area in the acquired colors. The background color may also be identified by the user through the input unit 16. The evaluation target screen may be specified by the user, or specified beforehand by a designer of a system in which the screen is used.

The attractiveness calculation unit 12 calculates the degree of attractiveness of a color used for each object other than the background by using color scheme information output from the color scheme information acquiring unit 11 or the improvement plan creating unit 15, and information indicating which color is the background. The degree of attractiveness means a value indicative of a degree of getting visual attention of a person who sees each color on the evaluation target screen. Specifically, the degree of attractiveness is a value obtained by considering both a degree of each color alone to get visual attention and a degree of the color to get visual attention compared with the other colors used on the same screen, i.e., a value for evaluating the conspicuousness of each color in terms of the entire screen.

Next, the method of calculating the degree of attractiveness will be described. For example, as described in NPL 2, when each color is converted into the HLS color model, conspicuousness He attributed to hue H and conspicuousness R attributed to lightness L of a target color are calculated as in the following equations (1) to (3), respectively. Then, a total value PC obtained by summing up He, R, and saturation S of the target color is, for example, calculated as in the following equation (4) as a value indicative of a degree of the color alone to get visual attention.

Conspicuousness attributed to hue H $$He = |1-(H/\pi)| \quad (1)$$

Conspicuousness attributed to lightness L $$R = L^m + k|L-L_B|^n \quad L \geq L_B \quad (2)$$

$$R = L^m - k|L-L_B|^n \quad L < L_B \quad (3)$$

where $L_B$ is a lightness value of the background color in the HLS color model. Further, k, m, and n are constants, which are set as k=0.65, m=0.4, and n=0.2, for example.

Degree of color alone to get visual attention $$PC = He + R + S \quad (4)$$

As described in NPL 2, for example, the degree of getting visual attention compared with the other colors used on the same screen is calculated as in the following equation (5) as a value HC using a color difference d as distance from an average color to each color on the color space obtained after each color is converted into the CIE L*a*b* color model. Here, for example, the value of the average color is calculated in such a manner that each value of L*, a*, b* is multiplied by the area of each color having each value, all the multiplied values are added, and the added value is further divided by the entire area. The value of HC can be calculated with a high degree of accuracy by considering the area in the calculation of the average color.

Degree of getting visual attention compared with other colors used on same screen $$HC=|(d-d_m)/std| \quad (5)$$

where $d_m$ is the average value of d, and std is the standard deviation of d.

For example, the degree of attractiveness is calculated by simply summing up the value PC of the degree of the color alone to get visual attention and the value HC of the degree of getting visual attention compared with the other colors used on the same screen. The degree of attractiveness may also be calculated by any other method, such as to multiply the value of PC and the value of HC by given coefficients, respectively, before summing up both values.

The importance storage unit 13 stores information on the level of degree of importance of each of objects displayed on the screen or objects to be possibly displayed. For example, the information on the level of importance is expressed by scores, such as "100 points," "80 points," "20 points," and so on. Note that the degree of importance is set in terms of the importance of information to the user who views the screen in consideration of the meaning of information indicated by each object.

The color scheme appropriateness determining unit 14 compares the value of degree of importance of each object stored in the importance storage unit 13 with the value of degree of attractiveness of a color used for each object output from the attractiveness calculation unit 12 to determine the appropriateness of the color scheme. Specifically, for example, the color scheme appropriateness determining unit 14 calculates the order of degree of importance of each object and the order of degree of attractiveness of a color used for each object, respectively, and compares both orders of the same object. When the order of the degree of importance of each object matches the order of the degree of attractiveness of a color used for each object, the color scheme appropriateness determining unit 14 determines that the color of the object is in an appropriate color scheme, while when both do not match, the color scheme appropriateness determining unit 14 determines that the color of the object is not in an appropriate color scheme.

When the order of degrees of importance of all objects matches the order of degrees of attractiveness of used colors thereof, the color scheme appropriateness determining unit 14 may make a determination using a relative degree of attractiveness obtained by adding a relative level of degree of importance of each object when the object is compared with the degrees of importance of objects other than the object concerned and a condition of whether a relative level of degree of attractiveness of a color used for each object when the color is compared with the degrees of attractiveness of colors other than the color concerned is nearly equal For example, the color scheme appropriateness determining unit 14 calculates a ratio of attractiveness of each object as a value obtained by dividing the value of attractiveness by the value of importance. Then, the color scheme appropriateness determining unit 14 compares the ratio of attractiveness of an object of the highest importance with the ratio of attractiveness of a color used for each object. When both are nearly equal, "approval" is determined. If not, "disapproval" is determined. For example, the color scheme appropriateness determining unit 14 determines whether a difference from the ratio of attractiveness of the object of the highest importance falls within a predetermined value to determine whether the ratio of attractiveness is nearly equal. In the case of the determination using the relative degree of attractiveness, the color scheme appropriateness determining unit 14 may also use any value other than the ratio of attractiveness.

The color scheme appropriateness determining unit 14 outputs at least a determination result of each object on the appropriateness of the color scheme, the order of degree of importance of each object, and the order of degree of attractiveness of a color used for each object. The color scheme appropriateness determining unit 14 may also output the value of importance of each object and the value of attractiveness of a color used for each object together. In addition, the determination result of the entire screen may be output based on the determination result of each object on the appropriateness of the color scheme. For example, the determination result of the entire screen is determined as follows: If the determination results of all the objects on the appropriateness of the color scheme are "approval", "approval" is output, while if not, "disapproval" is output.

The improvement plan creating unit 15 refers to the determination result of each object on the appropriateness of the color scheme output from the color scheme appropriateness determining unit 14. When the number of objects for which "disapproval" is determined is one or more, the improvement plan creating unit 15 further refers to the order of degree of importance of each object and the order of degree of attractiveness of a color used for each object to create an improvement plan in which changes are added to colors used for objects for which "disapproved" is determined. The improvement plan creating unit 15 uses, for example, a method of changing colors to keep the hue in order to keep a rough tone and changing the saturation and the lightness to coordinate the degrees of attractiveness. Note that the improvement plan creating unit 15 may also change colors by changing both or either of the saturation and the lightness by given values.

Upon completion of changing colors, the improvement plan creating unit 15 outputs, to the attractiveness calculation unit 12, a used color used for each object in the improvement plan, new color scheme information indicative of the area, and information for identifying a background color. Then, the improvement plan creating unit 15 causes the attractiveness calculation unit 12 to calculate the degree of attractiveness of the color scheme in the created improvement plan and the color scheme appropriateness determining unit 14 to determine the appropriateness of the color scheme once again.

When the determination results of all the objects on the appropriateness of the color scheme output from the color scheme appropriateness determining unit 14 are "approval," the improvement plan creating unit 15 outputs, to the screen drawing unit 16, the used colors of respective objects as the final improvement plan without making any color change. When the appropriateness of the color scheme for all the objects on the evaluation target screen are "approval" without any improvement, the improvement plan creating unit 15 directly outputs the colors used for respective objects on the evaluation target screen.

The screen drawing unit 16 reflects information on used colors of respective objects output from the improvement plan creating unit 15 on the screen displayed on the output unit 19.

The input unit 18 is used to designate the evaluation target screen according to an operation from a system user. For example, the input unit 18 may be an input device such as a mouse, a keyboard, or a touch panel.

The output unit 19 displays an evaluation target screen designated by the user or an evaluation target screen on which an improvement by the improvement creation unit 15 is reflected. The output unit 19 may be, for example, a display device.

Figure 2:
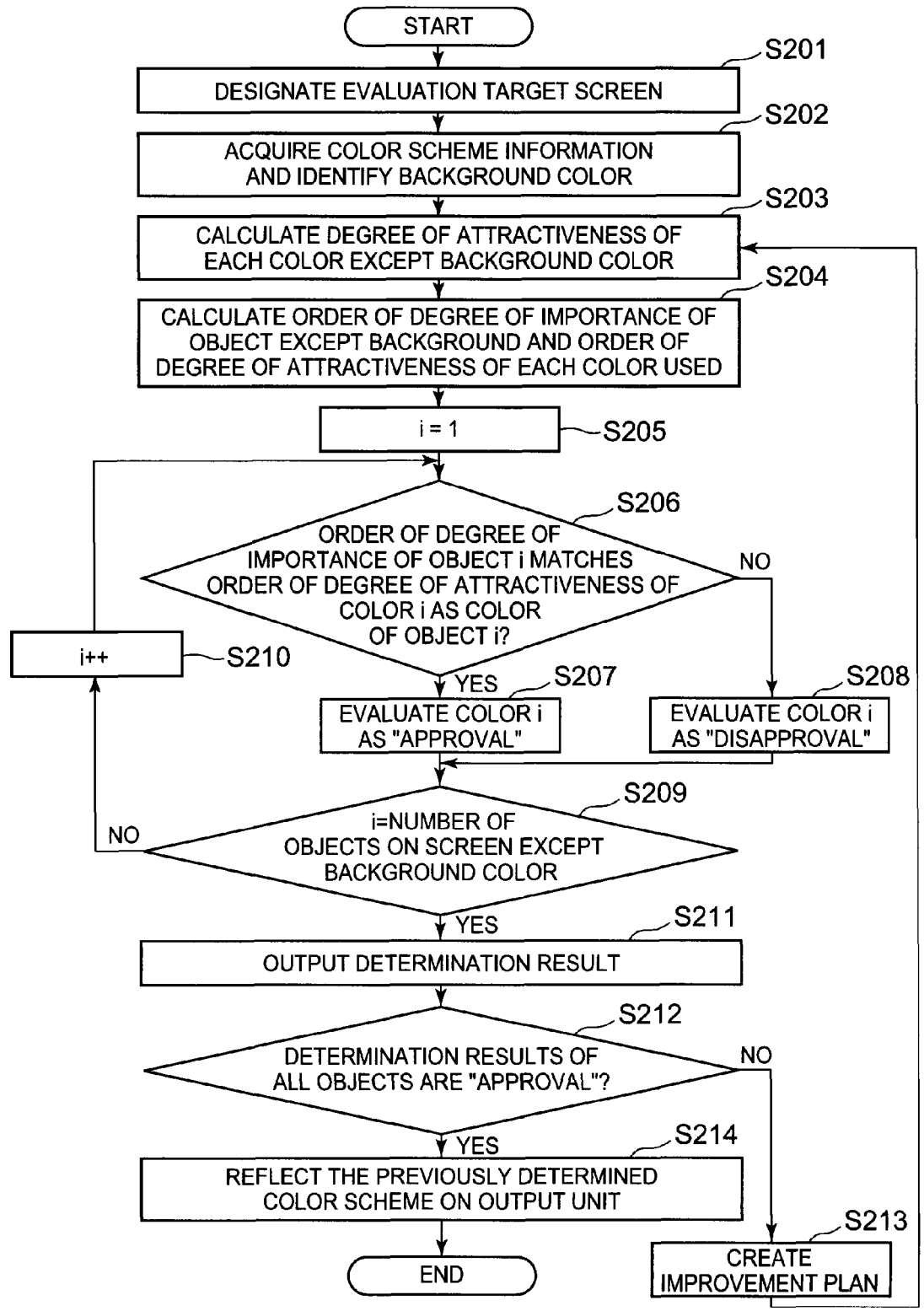
FIG. 2 It depicts a flowchart showing an operation example of a color scheme changing process in the color scheme changing apparatus.

FIG. 2 is a flowchart showing an operation example of a color scheme changing process in the color scheme changing apparatus 1 of the exemplary embodiment. The operation of the color scheme changing apparatus 1 will be described below with reference to FIG. 2. First, the user designates an evaluation target screen through the input unit 18 (step S201).

From the designated evaluation target screen, the color scheme information acquiring unit 11 acquires, as color scheme information, information for identifying objects on the evaluation target screen, all colors used for these objects, and the areas of the respective colors to identify a color of the largest area as the background color (step S202). Next, the attractiveness calculation unit 12 uses the color scheme information and information for identifying the background color output from the color scheme information acquiring unit 11 to calculate the degree of attractiveness of each of colors used for objects other than the background (step S203).

Next, the color scheme appropriateness determining unit 14 uses information on the degrees of attractiveness of colors used for objects except the background color to calculate the order of degrees of attractiveness of the colors used for the objects except the background color. The color scheme appropriateness determining unit 14 further uses importance information as information on the degree of importance set for each object and stored in the importance storage unit 13 to calculate the order of degree of importance of each object (step S204).

Next, the color scheme appropriateness determining unit 14 assigns one to a variable i (step S205). The color scheme appropriateness determining unit 14 further determines whether the order of degree of importance of an object i as the i-th object matches the order of degree of attractiveness of a color i as the color used for the object i (step S206). When YES in step S206, the color scheme appropriateness determining unit 14 determines the object i as "approval" (step S207). When NO in step S206, the color scheme appropriateness determining unit 14 determines the object i as "disapproval" (step S208). Upon completion of the determination of the object i, the color scheme appropriateness determining unit 14 determines whether i corresponds to the number of objects other than the background color on the screen to confirm whether the determinations of all objects other than the background are completed (step S209). When the determinations of all objects are not completed, one is added to i to change the determination target to the next object (step S210), and a determination is made again. When the determinations of all objects are completed, the color scheme appropriateness determining unit 14 outputs the determination results (step S211).

Next, the improvement plan creating unit 15 checks on the determination results output from the color scheme appropriateness determining unit 14 (step S212). When the determination results of one or more colors are "disapproval," the improvement plan creating unit 15 creates an improvement plan in which a color is changed, and outputs the color used in the created improvement plan and the area of the color to the attractiveness calculation unit 12 as new color scheme information together with information for identifying the background color (step S213). The creation and output of the improvement plan are repeated until the determination results of all colors output from the color scheme appropriateness determining unit 14 become "approval" (step S203 to step S213).

In step S212, when the determination results of all colors output from the color scheme appropriateness determining unit 14 are "approval," the improvement plan creating unit 15 changes no color. In this case, the improvement plan creating unit 15 sets the color scheme as the previous determination target of the color scheme appropriateness determining unit 14 as a color scheme of the final improvement plan, and outputs, to the screen drawing unit 16, information on a used color of each object in the final improvement plan. The screen drawing unit 16 reflects, on the screen being displayed on the output unit 19 at the time, the used color of each object in the final improvement plan output from the improvement plan creating unit 15 (step S214). The color scheme changing process is ended at step S214.

Figure 3:
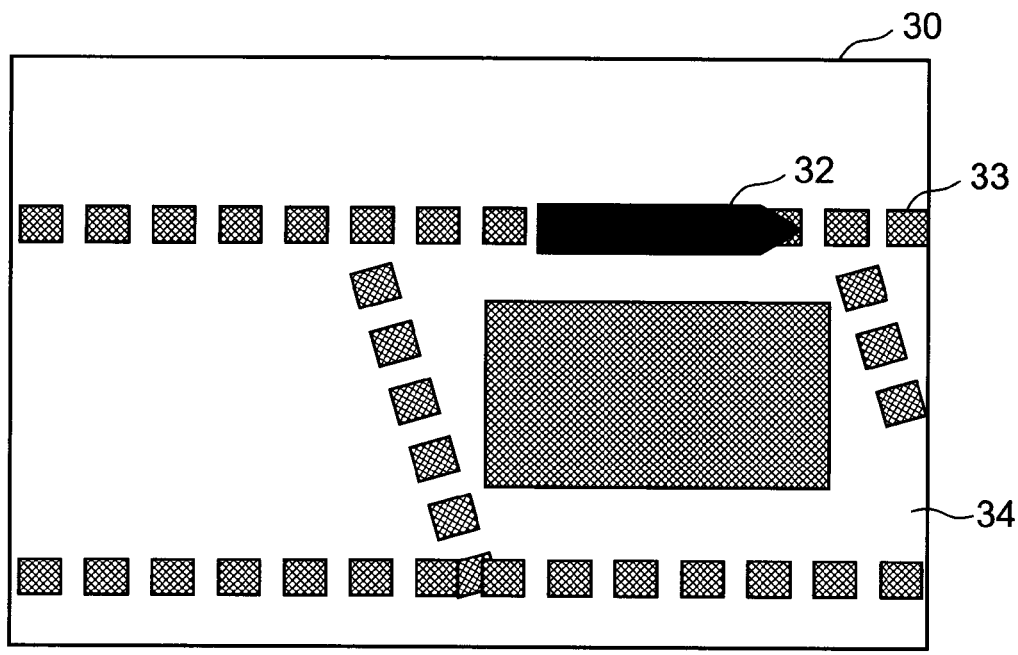
FIG. 3 It depicts an explanatory diagram showing an example of a screen at time 0.

Next, an example of the color scheme changing apparatus 1 of the exemplary embodiment will be described with reference to FIG. 2 to FIG. 15. Note that RGB values used in the following description are just an example and not always correspond to actual colors in the drawings. FIG. 3 is an explanatory diagram showing a screen at time 0. The screen shown in FIG. 3 is, for example, a screen viewed by a user who is monitoring railway operations, showing a train diagram 30 as an operation situation of a train displayed at time 0. On the train diagram 30, two pieces of information on a train 32 and a station and railway tracks 33 are displayed in colors different from each other. The kinds of colors used are three including a background color in addition to the colors of these two pieces of information. When each color is represented by an RGB value, #0000FF is used as the color to describe the train 32, #FF6600 is used as the color to describe the station and railway tracks 33, and #FFFFFF is used as the color to describe a background 34, respectively.

Figure 4:
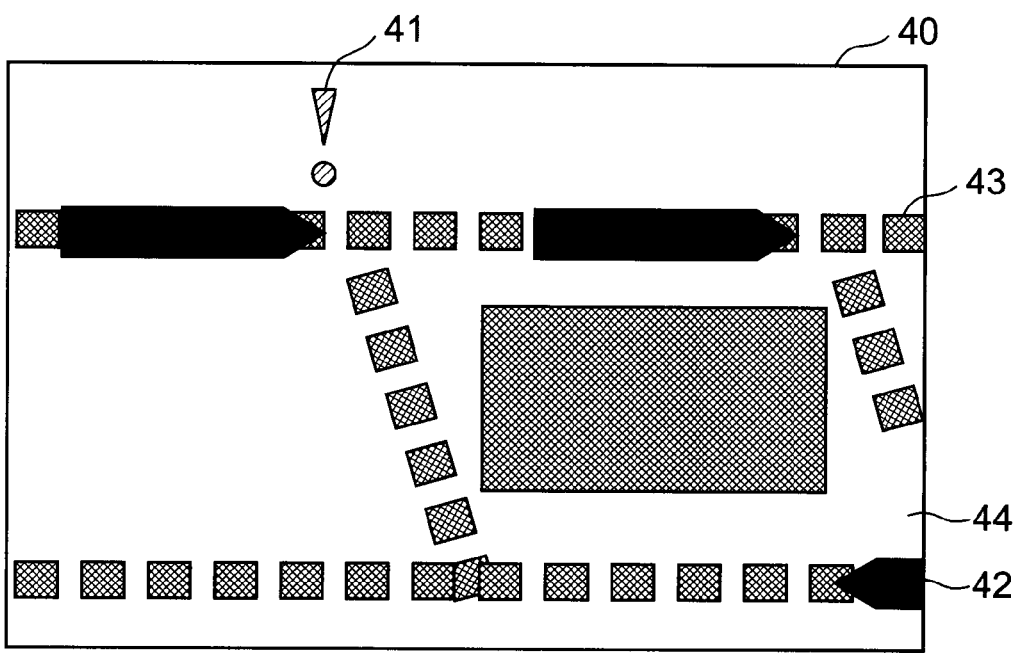
FIG. 4 It depicts an explanatory diagram showing an example of the screen at time t.

FIG. 4 is an explanatory diagram showing an example of the screen at time t. FIG. 4 shows a train diagram 40 at time t after a certain period has elapsed from the situation shown in FIG. 3. The situation changed from time 0, and three pieces of information, namely an approach alert 41, trains 42, and a station and railway tracks 43 are displayed on the train diagram 40 in colors different from one another. The kinds of colors used are four including a background color in addition to the colors of these three pieces of information. When each color is represented by an RGB value, #FF0000 is used as the color to describe the approach alert 41, #0000FF is used as the color to describe the trains 42, #FF6600 is used to describe the station and railway tracks 43, and #FFFFFF is used as the color to describe a background 44. Suppose that, since the situation on the screen has changed, the user feels uncomfortable about the balance of the color scheme on the screen and hence applies the color scheme changing apparatus 1 of the exemplary embodiment to improve the color scheme.

First, the user designates the train diagram 40 as the evaluation target screen through the input unit 18 (step S201). Then, the color scheme information acquiring unit 11 acquires, as color scheme information, all objects displayed on the train diagram 40, and a color used for each object and the area thereof, and identifies a color of the largest area as the background color (step S202).

FIG. 5 is an explanatory diagram representing an example of a data structure including colors and areas output from the color scheme information acquiring unit 11. The object name in a data item 51 is information for identifying each object displayed on the evaluation target screen. The color (RGB) in a data item 52 indicates the RGB value of each color on the screen. The area (px) in a data item 53 indicates the number of pixels of the area of each color used on the screen. The attribute in a data item 54 is information for identifying whether each color is the background color or not. In the example, since #FFFFFF has the largest area of 4900 px, #FFFFFF is identified as the background color. The screen in a data item 55 is information for identifying which is the evaluation target screen.

Next, the attractiveness calculation unit 12 uses color scheme information on the train diagram 40 and information for identifying the background color output from the color scheme information acquiring unit 11 to calculate the degree of attractiveness of each color used for each object other than the background (step S203). The degree of attractiveness is calculated by summing up a characteristic attractiveness as the degree of the color alone to get visual attention and a heterogeneous attractiveness as the degree of the color to get visual attention compared with those of the other colors used on the same screen. The characteristic attractiveness is calculated using the hue, saturation, and lightness of the target color. The heterogeneous attractiveness is calculated using information on the color and area of each color including the background color and a color difference as distance from an average color to each color on the color space.

FIG. 6 is an explanatory diagram representing an example of a data structure including the degree of attractiveness of each color output from the attractiveness calculation unit 12. The characteristic attractiveness is indicated in a data item 61, and the heterogeneous attractiveness is indicated in a data item 62. The degree of attractiveness in a data item 63 indicates a value obtained by summing up the characteristic attractiveness and the heterogeneous attractiveness of each color. Note that the characteristic attractiveness, the heterogeneous attractiveness, and the degree of attractiveness need not necessarily be the values calculated using the above-mentioned equations (1) to (5).

In the example, the values of characteristic attractiveness are calculated as follows: #FF0000 is 3.0, #0000FF is 2.8, and #FF6600 is 2.3. The values of heterogeneous attractiveness are calculated as follows: #FF0000 is 1.7, #0000FF is 2.2, and #FF6600 is 0.6. As a result, the degrees of attractiveness are as follows: #FF0000 is 4.7, #0000FF is 5.0, and #FF6600 is 2.9. Since the heterogeneous attractiveness is used as a factor of the degree of attractiveness, the conspicuousness of each color in consideration of the balance of colors in terms of the entire screen in addition to the conspicuousness of the color alone can be quantified.

When the attractiveness calculation unit 12 outputs the degree of attractiveness of each color used for each object other than the background, the color scheme appropriateness determining unit 14 calculates the order of the degree of attractiveness based on the degree of attractiveness (step S204). FIG. 7 is an explanatory diagram representing an example of a data structure including the order of the degree of attractiveness of each color created by the color scheme appropriateness determining unit 14. As shown in FIG. 6, among the values of degrees of attractiveness, #0000FF as the color of object 2 is 5.0 and this value is largest. #FF0000 as the color of object 1 is 4.7 and this is the second-largest value. #FF6600 as the color of object 3 is 2.9 and this value is smallest. Thus, the order of degrees of attractiveness in the data item 71 is as follows: #0000FF as the color of object 2 is 1, #FF0000 as the color of object 1 is 2, and #FF6600 as the color of object 3 is 3.

Next, the color scheme appropriateness determining unit 14 refers to importance information as information on the degree of importance set for each object and stored in the importance storage unit 13. FIG. 8 is an explanatory diagram representing an example of a data structure including importance information indicative of the level of the degree of importance of each color and stored in the importance storage unit 13. The importance in a data item 81 indicates the degree of importance of each object to the user who views the train diagram. Here, the higher the importance, the larger the value. A data item 82 indicates the meaning of information represented by each object. In the example, the degrees of importance are set as follows: Information that is most important to the user who sees the train diagram is the approach alert, the importance of the train as the next monitoring target is the second highest, and the importance of information on the station and railway tracks is the lowest. Thus, the importance of object 1 representing the approach alert is the highest with a score of 100, the importance of object 2 representing the train is the second highest with a score of 80, and the importance of object 3 representing the station and railway tracks is the lowest with a score of 20.

The color scheme appropriateness determining unit 14 refers to importance information stored in the importance information storage unit 13 as shown in FIG. 8 to calculate the order of degree of importance of each object (step S204). FIG. 9 is an explanatory diagram representing an example of a data structure including the order of degree of importance of each color created by the color scheme appropriateness determining unit 14. The order of importance in a data item 91 indicates the order of level of degree of importance of each object, which is calculated based on the importance information indicated in the data item 81 of FIG. 8. Among the pieces of importance information stored in the importance storage unit 13, the degree of importance of object 1 is the highest with a score of 100, the degree of importance of object 2 is the second highest with a score of 80, and the degree of importance of object 3 is the lowest with a score of 20. Therefore, the order of degrees of importance in the data item 91 is as follows: Object 1 is 1, object 2 is 2, and object 3 is 3.

Next, the color scheme appropriateness determining unit 14 compares the order of the degree of importance of each object with the order of the degree of attractiveness used for the same object. If both match, "approval" is determined for the color, while if not, "disapproval" is determined for the color, and the determination result is output to the improvement plan creating unit 15 (step S205 to step S211). FIG. 10 is an explanatory diagram representing an example of a data structure including first determination results output from the color scheme appropriateness determining unit 14. The determination result in a data item 101 indicates the result of comparing the order of the degree of importance of each object with the order of the degree of attractiveness of each object output from the color scheme appropriateness determining unit 14.

The order of the degree of attractiveness of object 1 is 2, but the order of the degree of importance thereof is 1. Since both orders do not match, the determination on object 1 is "disapproval." The order of the degree of attractiveness of object 2 is 1, but the order of the degree of importance thereof is 2. Since both orders do not match, the determination on object 2 is "disapproval." Both the order of the degree of attractiveness and the order of the degree of importance of object 3 are 3. Since both orders match, the determination on object 3 is "approval."

The improvement plan creating unit 15 uses the determination results output from the color scheme appropriateness determining unit 14 to confirm whether "approval" is determined for all objects (step S212). Since "disapproval" is determined for object 1 and object 2 this time, the improvement plan creating unit 15 creates an improvement plan for a color scheme (step S213). Specifically, the improvement plan creating unit 15 changes colors used for the objects for which "disapproval" is determined. The improvement plan creating unit 15 changes the saturation and the lightness to coordinate the degrees of attractiveness while keeping the hue to keep a rough tone. The color changes may be made, for example, by changing either the saturation or the lightness by a given value.

In the example, since "disapproval" is determined for object 1 and object 2, the improvement plan creating unit 15 changes the saturation and lightness of the colors used for these two objects by given values to make a coordination so that the order of the degrees of attractiveness will match the order of the degrees of importance. Since the order of the degree of importance of #FF0000 as the color used for object 1 is 1 but the order of the degree of attractiveness thereof is 2, a coordination is made to raise the order of the degree of attractiveness. Further, since the order of the degree of importance of #0000FF as the color used for object 2 is 2 but the order of the degree of attractiveness thereof is 1, a coordination is made to lower the order of the degree of attractiveness. Color scheme information in the created improvement plan is output to the attractiveness calculation unit 12 to check whether the appropriateness of the color scheme is improved or not.

FIG. 11 is an explanatory diagram representing an example of a data structure including colors in a first improvement plan created by the improvement plan creating unit 15. In the example, the lightness of the color for object 1 is incremented by 5 to change from #FF0000 to #FF1919. The saturation of the color for object 2 is decremented by 5 to change from #0000FF to #0707F9. Note that, since object 3 for which #FF6600 is used before the creation of the improvement plan is given "approval" in terms of the determination result of the appropriateness of the color scheme, no change is made.

Next, the attractiveness calculation unit 12 uses the color scheme information output from the improvement plan creating unit 15 to calculate the degrees of attractiveness of all colors used for the respective objects in the improvement plan except the background color (step S203). Then, the color scheme appropriateness determining unit 14 calculates the order of degrees of attractiveness of the colors used for the respective objects except the background color and the order of degrees of importance of the respective objects (step S204). Then, the color scheme appropriateness determining unit 14 compares the order of the degree of attractiveness of each object output from the attractiveness calculation unit 12 with the order of the degree of importance of the same object stored in the importance storage unit 13, determines the appropriateness of each color used in the improvement plan, and outputs the determination result (step S204 to step S211).

FIG. 12 is an explanatory diagram representing an example of a data structure including second determination results output from the color scheme appropriateness determining unit 14. Here, among the colors used for the respective objects in the improvement plan, the determination results of #FF1919 as the color used for object 1 and #0707F9 as the color used for object 2 are "disapproval." Therefore, the improvement plan creating unit 15 creates an improvement plan for a color scheme again, and outputs color scheme information on a further improvement plan to the attractiveness calculation unit 12 (step S213). Then, the calculation of attractiveness, checking of the appropriateness of the color scheme, and creation of an improvement plan are repeated (step S203 to step S213) until the determination result in step S212 becomes YES.

FIG. 13 is an explanatory diagram representing an example of a data structure including final determination results output from the color scheme appropriateness determining unit 14. In FIG. 13, since all the objects are so determined that the order of degrees of importance of all the objects match the order of degrees of attractiveness thereof, the determination results of the appropriateness of all the objects are "approval." The improvement plan creating unit 15 refers to the determination results of the appropriateness of the color scheme shown in FIG. 13. In this case, since the determination results of the appropriateness of all the objects are "approval" (YES in step S212), the improvement plan creating unit 15 determines that the colors are changed to coordinate the degrees of attractiveness appropriately. Therefore, the improvement plan creating unit 15 sets, as the final improvement plan, the previous improvement plan determined by the color scheme appropriateness determining unit 14 without any change in color, and outputs information on the color used for each object to the screen drawing unit 16.

FIG. 14 is an explanatory diagram representing an example of a data structure including the final improvement plan created by the improvement plan creating unit 15. The screen drawing unit 16 uses the used colors in the final improvement plan output from the improvement plan creating unit 15 to reflect the used colors in the final improvement plan on the screen being displayed on the output unit 19 at the time (step S214). As shown in FIG. 14, in the final improvement plan created by the improvement plan creating unit 15, the color of object 1 is changed to #FF3333 and the color of object 2 is changed to #1F1FAD. Therefore, the screen drawing unit 16 changes the color of object 1 to #FF3333 and the color of object 2 to #1F1FAD to reflect the final improvement plan on the screen being displayed.

Figure 15:
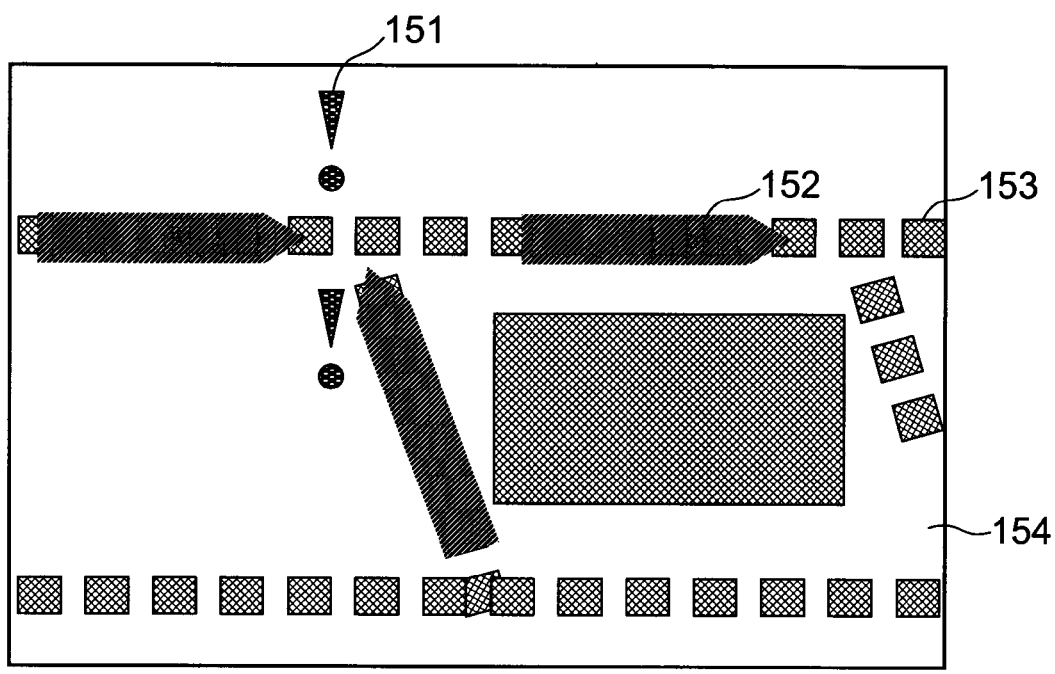
FIG. 15 It depicts an explanatory diagram representing an example of the screen at time t+Δt at which a screen drawing unit causes an output unit to reflect a color scheme in the final improvement plan.

FIG. 15 is an explanatory diagram representing an example of the screen at time t+Δt at which the screen drawing unit 16 causes the output unit 19 to reflect the color scheme in the final improvement plan. Note that Δt denotes a time period from the start of the color scheme changing process until the completion thereof. Since a train has moved during Δt, the situation of the screen has changed to increase the number of pieces of information indicative of the approach alert. On the screen, #FF3333 as the color representing approach alerts 151, #1F1FAD as the color representing trains 152, and #FF6600 as the color representing a station and railway tracks 153, and #FFFFFF as the color representing a background 154 are used, respectively.

As described above, the color scheme changing apparatus 1 of the exemplary embodiment creates an improvement plan in which the color scheme has been changed to a color scheme upon request of the user to make information on the screen conspicuous according to the degree of importance thereof on the screen at which the user is looking, and reflects the improvement plan on the screen. Thus, the user looking at the screen can instantaneously improve a color(s) that has not stood out appropriately according to the degree of importance of information on the screen due to a situation change on the screen.

The color scheme changing apparatus 1 of the exemplary embodiment may also designate an evaluation target screen automatically at given time intervals, rather than changing the color scheme of the screen upon request of the user, to determine the appropriateness of the color scheme of the screen and reflect the color scheme in the improvement plan. Further, the user may perform operations on the screen to determine the appropriateness of the color scheme of the screen and reflect the color scheme in the improvement plan automatically at the timing when a change in the balance of the color scheme on the screen occurs. In these cases, the color scheme can be improved in real time even if the user does not deliberately start the color scheme changing process. Further, even if the balance of the color scheme on the entire screen breaks down before the user realizes it, the appropriateness of the color scheme can be determined automatically to change the color scheme to an appropriate color scheme.

In addition, the color scheme changing apparatus 1 of the exemplary embodiment may set, as an evaluation target, the balance of the color scheme of all videos on the output unit 19, not only the color scheme of the screen of a target application to create and reflect an improvement plan.

Note that, in the aforementioned exemplary embodiment, color scheme changing apparatuses as shown in the following (1) to (6) are also disclosed.

(1) A color scheme changing apparatus 1 including: an input unit (e.g., the input unit 18) which accepts the designation of an evaluation target screen from a user; a color scheme information acquiring unit (e.g., the color scheme information acquiring unit 11) which acquires identification information on objects displayed on the evaluation target screen and color scheme information including all used colors used for the objects; an attractiveness calculation unit (e.g., the attractiveness calculation unit 12) which uses the color scheme information to perform attractiveness calculation processing for calculating degrees of attractiveness indicative of degrees of the used colors to get visual attention, respectively; an importance storage unit (e.g., the importance storage unit 13) which stores importance information indicative of levels of importance of the respective objects relative to one another; a color scheme appropriateness determining unit (e.g., the color scheme appropriateness determining unit 14) which calculates the order of importance information associated with the objects based on the levels of the importance information, calculates the order of the degrees of attractiveness associated with the objects based on levels of the degrees of attractiveness, determines whether the order of the importance information associated with the objects matches the order of the degrees of attractiveness associated with the objects, and outputs determination results; an improvement plan creating unit (e.g., the improvement plan creating unit 15) which outputs, to the attractiveness calculation unit (e.g., the attractiveness calculation unit 12), color scheme information in which at least one of the used colors used for the objects is changed when the order of the importance information associated with the objects does not match the order of the degrees of attractiveness associated with the objects in the determination results, or outputs improved color scheme information including the previously determined objects when the order of the importance information associated with the objects matches the order of the degrees of attractiveness associated with the objects in the determination results; a screen drawing unit (e.g., the screen drawing unit 16) which refers to the improved color scheme information to draw an evaluation target screen improved according to the improved color scheme information; and an output unit (e.g., the output unit 19) which displays the evaluation target screen drawn by the screen drawing unit.

(2) The color scheme changing apparatus may also be configured such that color scheme information includes the areas of objects displayed on an evaluation target screen, and the attractiveness calculation unit uses the color scheme information to perform attractiveness calculation processing for calculating heterogeneous attractiveness as degree of each of the used colors to get visual attention when the color is compared with the other colors used on the evaluation target screen to calculate the degree of attractiveness including the heterogeneous attractiveness. According to such a color scheme changing apparatus, since the heterogeneous attractiveness is calculated using the area, the heterogeneous attractiveness can be calculated with a high degree of accuracy. Further, since the degree of attractiveness including the heterogeneous attractiveness is calculated, the degree of attractiveness in consideration of the degree of getting visual attention when the color is compared with the other colors can be calculated.

(3) The color scheme changing apparatus may further be configured such that the color scheme information includes the areas of objects displayed on an evaluation target screen, the color scheme information acquiring unit identifies, as a background color, a used color used for an object having the largest area of those of all the used colors used for the objects on the evaluation target screen, and the attractiveness calculation unit uses information for identifying the background color to calculate the degrees of attractiveness as degrees of the used colors used for the objects to get visual attention, respectively. According to such a color scheme changing apparatus, since the degrees of attractiveness are calculated in consideration of the background color, the degrees of attractiveness can be calculated with a higher degree of accuracy.

(4) The color scheme changing apparatus may further be configured such that, when the order of the importance information on all the objects used on the evaluation target screen matches the order of the degrees of attractiveness thereof, the color scheme appropriateness determining unit uses values of the degrees of attractiveness and values of the degrees of importance to calculate a relative degree of attractiveness as an index used to determine a difference between a level of degree of importance of each of the used colors relative to the degrees of importance of the other used colors and a level of degree of attractiveness of the color relative to the degrees of attractiveness of the other used colors in order to determine whether the difference falls within a predetermined value. According to such a color scheme changing apparatus, it can be determined not only whether the conspicuousness of each color matches the order of the degree of importance but also whether the conspicuousness of each color matches the level of the degree of importance to some extent.

(5) The color scheme changing apparatus may further be configured such that, when there are objects whose order of the importance information does not match the order of the degrees of attractiveness thereof in the determination results, the improvement plan creating unit adjusts the saturation or lightness of at least one of the used colors of the objects to create an improvement plan indicative of a color scheme without any change in hue. According to such a color scheme changing apparatus, since keeping the hue enables an adjustment of the degree of attractiveness while keeping a tone, the color scheme changing apparatus can be applied to a case where significance is attached to the tone such as to use a reddish color for alert information.

(6) The color scheme information acquiring unit may also be configured to acquire color scheme information when a predetermined period has elapsed or when the evaluation target screen is changed by an operation from the user. According to such a color scheme changing apparatus, the color scheme can be improved in real time even if the user does not deliberately start the color scheme changing process. Further, even if the balance of the color scheme of the entire screen breaks down before the user realizes it, the appropriateness of the color scheme can be determined automatically to change the color scheme to an appropriate color scheme.

This application claims priority based on Japanese Patent Application No. 2012-43639, filed on Feb. 29, 2012, the disclosures of which are incorporated herein in their entirety.

While the present invention has been described with reference to the exemplary embodiment, the present invention is not limited to the aforementioned exemplary embodiment. Various changes understandable to those skilled in the art within the scope of the present invention can be made to the structure and details of the present invention.

INDUSTRIAL APPLICABILITY

The present invention can be applied to changing the color scheme of a screen used for a monitoring service.

REFERENCE SIGNS LIST 11 color scheme information acquiring unit
12 attractiveness calculation unit
13 importance storage unit
14 color scheme appropriateness determining unit
15 improvement plan creating unit
16 screen drawing unit
18 input unit
19 output unit

The invention claimed is:

1. A color scheme changing apparatus comprising:
an input unit which accepts designation of an evaluation target screen from a user;
a color scheme information acquiring unit which acquires identification information on objects displayed on the evaluation target screen and color scheme information including all colors used for the objects;
an attractiveness calculation unit which uses the color scheme information to perform attractiveness calculation processing for calculating degrees of attractiveness indicative of degrees of the used colors to get visual attention, respectively;
an importance storage unit which stores importance information indicative of levels of importance of the respective object relative to one another;
a color scheme appropriateness determining unit which calculates order of the importance information associated with the objects based on the levels of the importance information, calculates order of the degrees of attractiveness associated with the objects based on levels of the degrees of attractiveness, determines whether the order of the importance information associated with the objects matches the order of the degrees of attractiveness associated with the objects, and outputs determination results;
an improvement plan creating unit which outputs, to the attractiveness calculation unit, the color scheme information in which at least one of the used colors used for the objects is changed when the order of the importance information associated with the objects does not match the order of the degrees of attractiveness associated with the objects in the determination results, or outputs improved color scheme information including the previously determined objects when the order of the importance information associated with the objects matches the order of the degrees of attractiveness associated with the objects in the determination results;
a screen drawing unit which refers to the improved color scheme information to draw an evaluation target screen improved according to the improved color scheme information; and
an output unit which displays the evaluation target screen drawn by the screen drawing unit.

2. The color scheme changing apparatus according to claim 1, wherein
color scheme information includes areas of objects displayed on an evaluation target screen, and
the attractiveness calculation unit uses the color scheme information to perform attractiveness calculation processing for calculating heterogeneous attractiveness as a degree of each of the used colors to get visual attention when the color is compared with the other colors used on the evaluation target screen to calculate a degree of attractiveness including the heterogeneous attractiveness.

3. The color scheme changing apparatus according to claim 1, wherein
color scheme information includes areas of objects displayed on an evaluation target screen,
the color scheme information acquiring unit identifies, as a background color, a used color used for an object having the largest area of those of all the used colors used for the objects on the evaluation target screen, and
the attractiveness calculation unit uses information for identifying the background color to calculate degrees of attractiveness as degrees of the used colors used for the objects to get visual attention, respectively.

4. The color scheme changing apparatus according to claim 2, wherein
the color scheme information acquiring unit identifies, as a background color, a used color used for an object having the largest area of those of all the used colors used for the objects on the evaluation target screen, and
the attractiveness calculation unit uses information for identifying the background color to calculate degrees of attractiveness as degrees of the used colors used for the objects to get visual attention, respectively.

5. The color scheme changing apparatus according to claim 1, wherein
when the order of the importance information on all the objects used on the evaluation target screen matches the order of the degrees of attractiveness thereof, the color scheme appropriateness determining unit uses values of the degrees of attractiveness and values of the degrees of importance to calculate a relative degree of attractiveness as an index used to determine a difference between a level of degree of importance of each of the used colors relative to the degrees of importance of the other used colors and a level of degree of attractiveness relative to the degrees of attractiveness of the other used colors in order to determine whether the difference falls within a predetermined value.

6. The color scheme changing apparatus according to claim 1, wherein
when there are objects whose order of the importance information does not match the order of the degrees of attractiveness thereof in the determination results, the improvement plan creating unit adjusts saturation or lightness of at least one of the used colors of the objects to create an improvement plan indicative of a color scheme without any change in hue.

7. The color scheme changing apparatus according to claim 1, wherein
the color scheme information acquiring unit acquires color scheme information when a predetermined period has elapsed or when the evaluation target screen is changed by an operation from the user.

8. A color scheme changing method comprising:
accepting designation of an evaluation target screen from a user;
acquiring identification information on objects displayed on the evaluation target screen and color scheme information including all colors used for the objects;

using the color scheme information to perform attractiveness calculation processing for calculating degrees of attractiveness indicative of degrees of the used colors to get visual attention, respectively;

storing importance information indicative of levels of importance of the respective object relative to one another;

calculating order of the importance information associated with the objects based on the levels of the importance information, calculating order of the degrees of attractiveness associated with the objects based on levels of the degrees of attractiveness, determining whether the order of the importance information associated with the objects matches the order of the degrees of attractiveness associated with the objects, and outputting determination results;

performing the attractiveness calculation processing using the color scheme information in which at least one of the used colors used for the objects is changed when the order of the importance information associated with the objects does not match the order of the degrees of attractiveness associated with the objects in the determination results, or outputting improved color scheme information including the previously determined objects when the order of the importance information associated with the objects matches the order of the degrees of attractiveness associated with the objects in the determination results;

referring to the improved color scheme information to draw an evaluation target screen improved according to the improved color scheme information; and displaying the evaluation target screen.

9. A non-transitory computer readable information recording medium storing a color scheme changing program that, when executed by a processor, performs a method for:

accepting designation of an evaluation target screen from a user;

acquiring identification information on objects displayed on the evaluation target screen and color scheme information including all colors used for the objects;

using the color scheme information to perform attractiveness calculation processing for calculating degrees of attractiveness indicative of degrees of the used colors to get visual attention, respectively;

storing importance information indicative of levels of importance of the respective object relative to one another;

calculating order of the importance information associated with the objects based on the levels of the importance information, calculating order of the degrees of attractiveness associated with the objects based on levels of the degrees of attractiveness, determining whether the order of the importance information associated with the objects matches the order of the degrees of attractiveness associated with the objects, and outputting determination results;

performing the attractiveness calculation processing using the color scheme information in which at least one of the used colors used for the objects is changed when the order of the importance information associated with the objects does not match the order of the degrees of attractiveness associated with the objects in the determination results, or outputting improved color scheme information including the previously determined objects when the order of the importance information associated with the objects matches the order of the degrees of attractiveness associated with the objects in the determination results;

referring to the improved color scheme information to draw an evaluation target screen improved according to the improved color scheme information; and displaying the evaluation target screen.

* * * * *